A. C. WOOLLEY.
Air-Vents.

No. 148,539.        Patented March 10, 1874.

WITNESSES:

INVENTOR
Alfred C Woolley
per. J. H. Alexander
ATTORNEY.

UNITED STATES PATENT OFFICE.

ALFRED C. WOOLLEY, OF ANNAPOLIS, MARYLAND, ASSIGNOR TO HIMSELF AND W. O. BIGELOW, OF SAME PLACE.

IMPROVEMENT IN AIR-VENTS.

Specification forming part of Letters Patent No. 148,539, dated March 10, 1874; application filed February 23, 1874.

*To all whom it may concern:*

Be it known that I, ALFRED C. WOOLLEY, of Annapolis, in the county of Anne Arundel and State of Maryland, have invented certain new and useful Improvements in Air-Vents; and I do hereby declare that the following is a full, clear, and exact description thereof, reference being had to the accompanying drawings and to the letters of reference marked thereon, which form part of this specification.

The nature of my invention consists in the construction and arrangement of a self-operating air-vent for barrels or other vessels containing liquids of any kind, as will be hereinafter more fully set forth.

In order to enable others skilled in the art to which my invention appertains to make and use the same, I will now proceed to describe its construction and operation, referring to the annexed drawing, in which—

Figure 1:
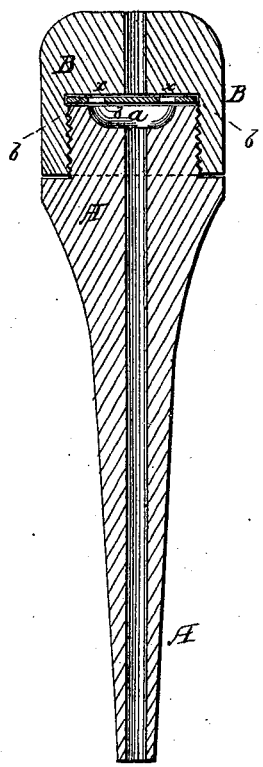
Figure 2:
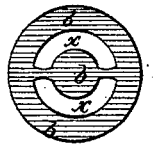

Figure 1 is a longitudinal section of my invention. Fig. 2 is a view of the rubber valve.

A represents a vent-tube of any suitable construction, provided with a screw-cap, B, the vent in the tube being continued through the cap. The upper end of the tube A is made concave, as shown at $a$. In the cap B is placed a rubber valve, $b$, provided with slots $x$ $x$. When the cap is screwed on the tube, the rubber valve $b$ makes the tube perfectly air-tight as regards any air escaping from the vessel to which the tube is applied; but as soon as a vacuum is formed in the vessel, the valve admits such quantity of air as may be required, and as soon as sufficient air is received the valve closes and remains perfectly tight, and also acts as a packing for the upper end of the vent-tube.

The valve is controlled entirely by the vacuum in the vessel, admitting no more air than is required to allow the liquid to run out freely at the spigot or outlet, thereby preserving the liquid.

Having thus fully described my invention, what I claim as new, and desire to secure by Letters Patent, is—

The combination of the vent-tube A, with concavity $a$ at its upper end, and the cap B, with interior rubber valve $b$, substantially as and for the purposes herein set forth.

In testimony that I claim the foregoing as my own I affix my signature in presence of two witnesses.

ALFRED C. WOOLLEY.

Witnesses:
 J. W. THAHNEY,
 ROBT. M. MCCLURE.